(12) United States Patent
Challener et al.

(10) Patent No.: US 8,347,348 B2
(45) Date of Patent: Jan. 1, 2013

(54) APPARATUS, SYSTEM, AND METHOD FOR PRE-BOOT POLICY MODIFICATION

(75) Inventors: David Carroll Challener, Raleigh, NC (US); Jeffrey Mark Estroff, Cary, NC (US); Mikio Hagiwara, Yamato (JP); Seiichi Kawano, Kanagawa (JP); Keiko Kokubun, Yokohama (JP); Randall Scott Springfield, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 976 days.

(21) Appl. No.: 12/059,805

(22) Filed: Mar. 31, 2008

(65) Prior Publication Data
US 2009/0249434 A1  Oct. 1, 2009

(51) Int. Cl.
*H04L 29/06* (2006.01)
(52) U.S. Cl. ................................. 726/1; 713/2
(58) Field of Classification Search .......... 726/1; 713/2, 713/165, 169, 171
See application file for complete search history.

(56) References Cited

U.S. PATENT DOCUMENTS

| | | | |
|---|---|---|---|
| 6,732,267 B1 * | 5/2004 | Wu et al. | 713/100 |
| 6,892,297 B1 * | 5/2005 | Aguilar et al. | 713/2 |
| 6,915,431 B1 * | 7/2005 | Vasudevan et al. | 713/171 |
| 7,085,385 B2 * | 8/2006 | Frantz et al. | 380/277 |
| 7,111,321 B1 * | 9/2006 | Watts et al. | 726/2 |
| 7,660,977 B2 * | 2/2010 | Zimmer et al. | 713/1 |
| 7,873,959 B2 * | 1/2011 | Zhu et al. | 717/172 |
| 2001/0056518 A1 * | 12/2001 | Maeda | 711/103 |
| 2003/0028766 A1 | 2/2003 | Gass et al. | |
| 2005/0021968 A1 | 1/2005 | Zimmer et al. | |
| 2005/0033956 A1 * | 2/2005 | Krempl | 713/156 |
| 2005/0033957 A1 * | 2/2005 | Enokida | 713/156 |
| 2005/0114682 A1 * | 5/2005 | Zimmer et al. | 713/187 |
| 2006/0174109 A1 * | 8/2006 | Flynn | 713/164 |

* cited by examiner

*Primary Examiner* — Ali Abyaneh
(74) *Attorney, Agent, or Firm* — Kunzler Law Group, PC

(57) ABSTRACT

An apparatus, system, and method are disclosed for pre-boot policy modification. A key module exchanges a key with a server in a secure environment. A communication module receives a policy encoded with the key. A decode module decodes the encoded policy using the key and saves the policy setting prior to booting an operating system on the computer. An update module boots the computer using the policy.

12 Claims, 6 Drawing Sheets

APPARATUS, SYSTEM, AND METHOD FOR PRE-BOOT POLICY MODIFICATION

BACKGROUND OF THE INVENTION

1. Field of the Invention

This invention relates to policy modification and more particularly relates to pre-boot policy modification.

2. Description of the Related Art

Computers are often organized as clients in a computer system. Each computer may communicate with a server through a network. The server may provide a number of services for each computer. For example, the server may backup each computer, provide software applications for each computer, and make databases available for each computer.

The server may also configure and manage each computer in the computer system. For example, the server may install software, update software, perform virus scans, and the like. The server typically communicates with an operating system of each computer when performing these maintenance functions.

Computers typically use a pre-boot environment such as a Binary Input/Output System (BIOS) to boot an operating system. The BIOS may include executable code that tests the computer, configures the computer, and loads the operating system from a storage device. The operating system may then provide the full functionality required by the computer.

The BIOS may employ a policy to configure the computer. For example, the BIOS may read one or more policy settings from the policy and configure the computer accordingly.

Unfortunately, the BIOS typically lacks the functionality to communicate through the network to the server. As a result, the BIOS may be unable to receive policy updates from the server and thus be unable to boot the computer with the updates.

SUMMARY OF THE INVENTION

From the foregoing discussion, there is a need for an apparatus, system, and method for pre-boot policy modification. Beneficially, such an apparatus, system, and method would modify a policy before a computer completes a boot operation.

The present invention has been developed in response to the present state of the art, and in particular, in response to the problems and needs in the art that have not yet been fully solved by currently available policy modification methods. Accordingly, the present invention has been developed to provide an apparatus, system, and method for pre-boot policy modification that overcome many or all of the above-discussed shortcomings in the art.

The apparatus for pre-boot policy modification is provided with a plurality of modules configured to functionally execute the steps of exchanging a key, receiving a policy, decoding the policy, and booting the computer. These modules in the described embodiments include the key module, a communication module, a decode module, and an update module.

The key module exchanges a key with a server in a secure environment. The communication module receives a policy encoded with the key. The decode module decodes the encoded policy using the key and saves the policy setting prior to booting an operating system on the computer. The update module boots the computer using the policy.

A system of the present invention is also presented for pre-boot policy modification. The system may be embodied in a client/server system. In particular, the system, in one embodiment, includes a network, a server, and a plurality of client computers.

The server is in communication with the network. The plurality of computers is also in communication with the server through the network. Each computer includes a key module, a communication module, a decode module, and an update module.

The key module exchanges a key with the server in a secure environment. The communication module receives a policy encoded with the key. The decode module decodes the encoded policy using the key and saves the policy setting prior to booting an operating system on the computer. The update module boots the client using the policy.

A method of the present invention is also presented for pre-boot policy modification. The method in the disclosed embodiments substantially includes the steps to carry out the functions presented above with respect to the operation of the described apparatus and system. In one embodiment, the method includes exchanging a key, receiving a policy, decoding the policy, and booting the computer.

A key module exchanges a key with a server in a secure environment. A communication module receives a policy encoded with the key. A decode module decodes the encoded policy using the key and saves the policy setting prior to booting an operating system on the computer. An update module boots the computer using the policy.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention modifies policies used in booting a computer before completing the boot. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
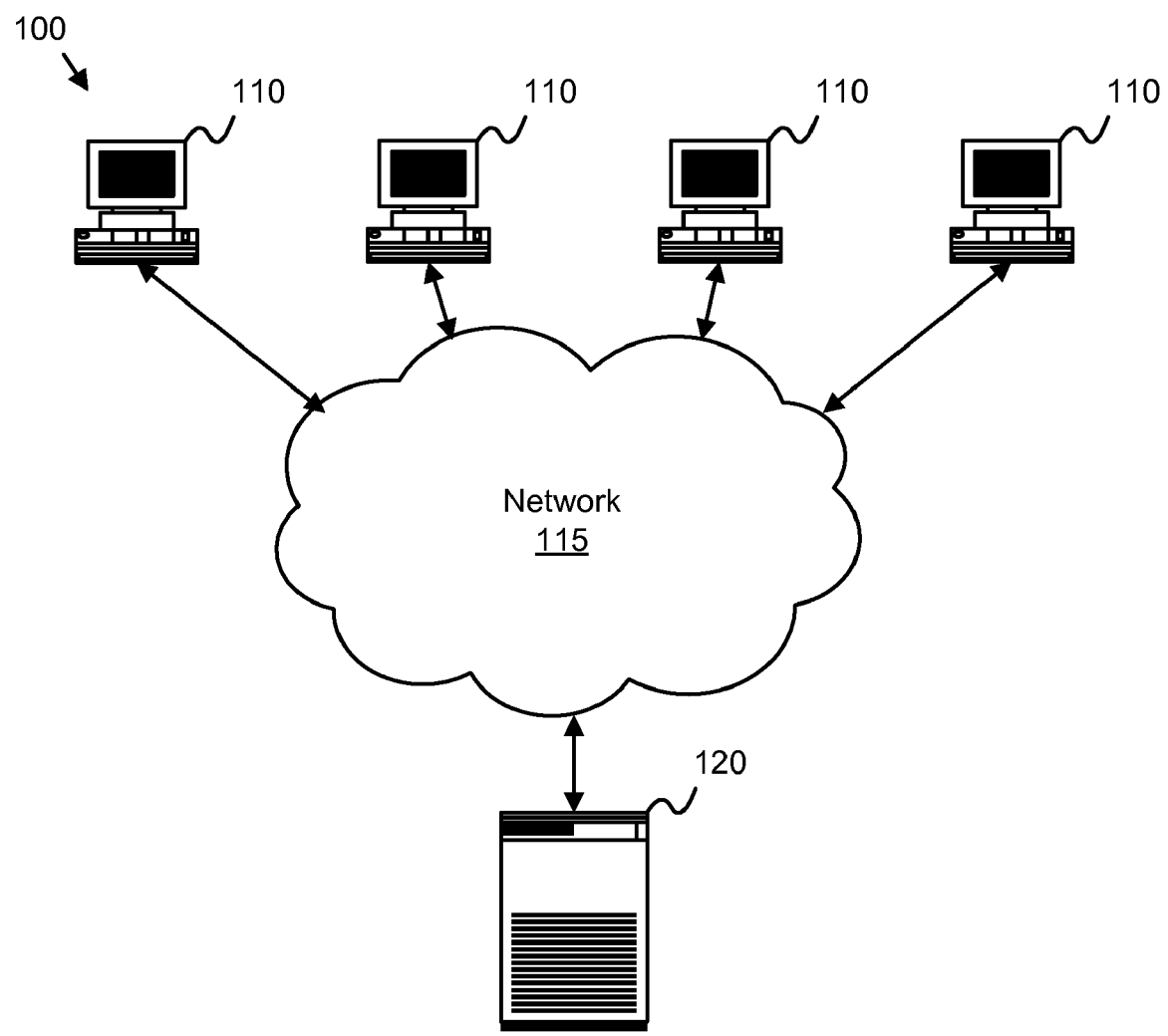
FIG. 1 is a schematic block diagram illustrating one embodiment of a client/server system in accordance with the present invention.

FIG. 1 is a schematic block diagram illustrating one embodiment of a client/server system 100 in accordance with the present invention. The system 100 includes one or more client computers 110, a network 115, and the server 120. The client computers 110 are referred to hereafter as computers 110.

The network may be a Wide Area Network (WAN), a Local Area Network (LAN), the Internet, or the like. The server 120 may also be configured as a mainframe computer, a blade server, or the like.

The server 120 may manage each of the computers 110. For example, the server 120 may backup the data on each of the computers 110, load and manage software on the computers 110, and manage the configuration of each of the computers 110.

Each of the computers 110 may execute an operating system. The server 120 may communicate through the network 115 with the operating systems of each of the computers 110. Unfortunately, the server 120 may be unable to communicate with and configure the computers 110 when the operating systems are not executing. As a result, in the past the server 120 may have been unable to configure the computers 110 prior to the booting of the computers 110. The present invention supports the pre-boot modification of computer policies as will be described hereafter.

Figure 2:
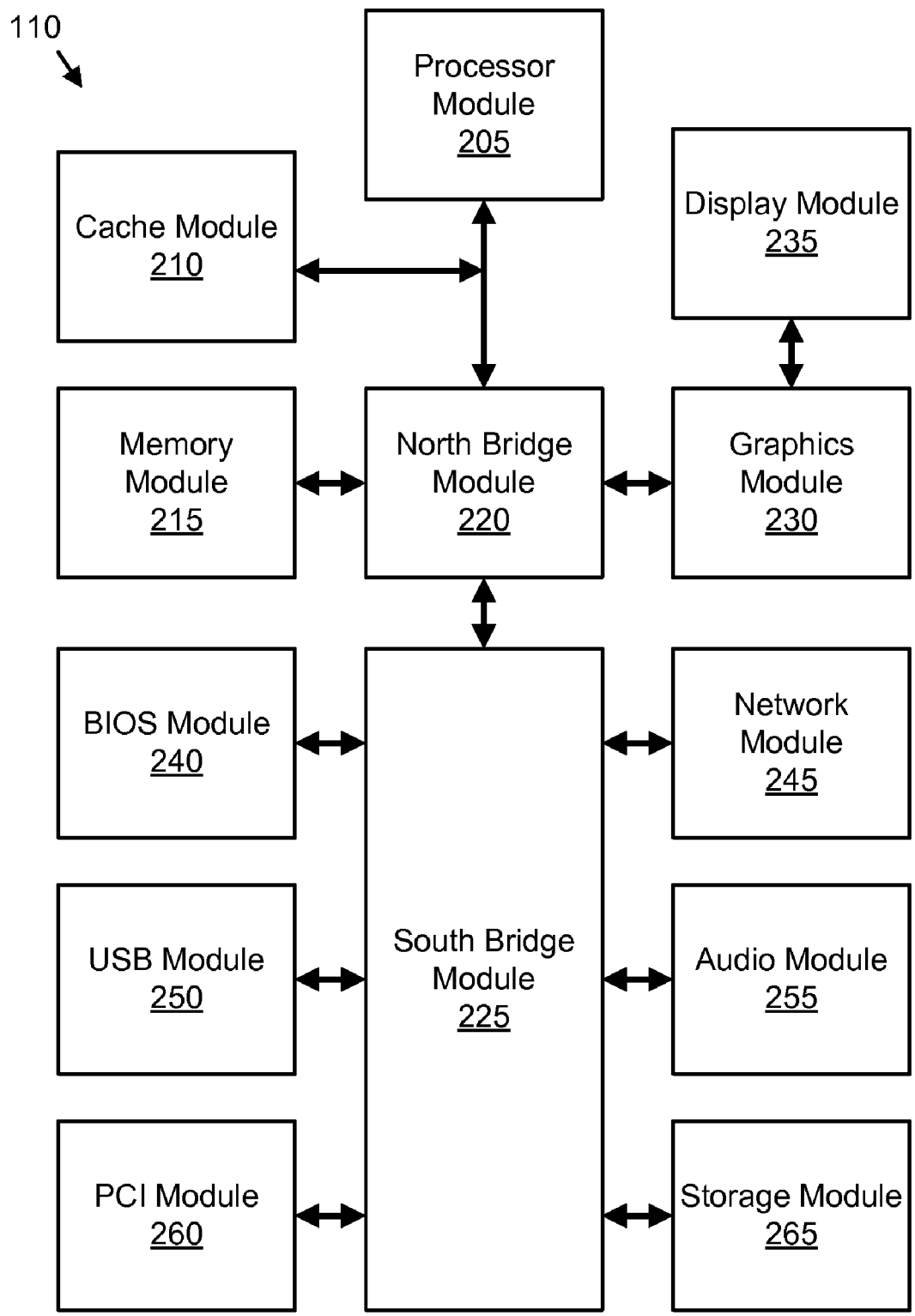
FIG. 2 is a schematic block diagram illustrating one embodiment of a computer of the present invention.

FIG. 2 is a schematic block diagram illustrating one embodiment of a computer 110 of the present invention. The computer 110 is a computer 110 of FIG. 1. The description of the computer 110 refers to elements of FIG. 1, like numbers referring to like elements. The computer 110 includes a processor module 205, a cache module 210, a memory module 215, a north bridge module 220, a south bridge module 225, a graphics module 230, a display module 235, a BIOS module 240, a network module 245, a peripheral component interconnect ("PCI") module 260, and a storage module 265.

The processor module 205, cache module 210, memory module 215, north bridge module 220, south bridge module 225, graphics module 230, display module 235, BIOS module 240, network module 245, PCI module 260, and storage module 265, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 215 stores software instructions and data. The processor module 205 executes the software instructions and manipulates the data as is well known to those skilled in the art. The software instructions and data may be configured as one or more computer readable programs.

The computer readable programs may be tangibly stored in the storage module 265. The storage module 265 may be a hard disk drive, an optical storage device, a holographic storage device, a micromechanical storage device, a semiconductor storage device, or the like.

The computer readable programs may include an operating system. The operating system may manage the computer 110, applications executing on the computer 110, and communications through the network 115. Unfortunately, the operating system and operating system functionality is typically unavailable before the computer 110 is booted.

The processor module 205 may communicate with the cache module 210 through a processor interface bus to reduce the average time to access memory module 215. The cache module 210 may store copies of the data from the most frequently used memory module 215 locations. The computer 110 may use one or more cache modules 210 such as a DDR2 cache memory or the like.

The north bridge module 220 may communicate with and provide bridging functionality between the processor module 205, the graphic module 230, the memory module 215, and the cache module 210. The processor module 205 may be connected to the north bridge module 220 over a, for example, six hundred sixty seven Megahertz (667 MHz) front side bus.

The north bridge module 220 may be connected to the south bridge module 225 through a direct media interface (DMI) bus. The DMI bus may provide a high-speed, bi-directional, point-to-point link supporting a clock rate for example of one Gigabytes per second (1 GBps) in each direction between the north bridge module 220 and the south bridge module 225. The south bridge module 225 may support and communicate with the BIOS module 240, the network module 245, the PCI module 260, and the storage module 265.

The PCI module 260 may communicate with the south bridge module 225 for transferring data or power to peripheral devices. The PCI module 260 may include a PCI bus for attaching the peripheral devices. The PCI bus can logically connect several peripheral devices over the same set of connections. The peripherals may be selected from a printer, a joystick, a scanner, or the like. The PCI module 260 may also be an expansion card as is well known to those skilled in the art.

The network module 245 may communicate with the south bridge module 225 to allow the computer 110 to communicate with other devices such as the server 120 over the network 115. The devices may include routers, bridges, computers, printers, and the like.

The display module 225 may communicate with the graphic module 230 to display the topological display of the user interface elements as will be described hereafter. The display module 235 may be a cathode ray tube (CRT), a liquid crystal display (LCD) monitor, or the like.

The BIOS module 240 may communicate instructions through the south bridge module 225 to boot the computer 110, so that software instructions stored on the storage module 265 can load, execute on the processor module 205, and assume control of the computer 110. In one embodiment, the BIOS module instructions are stored in a flash memory device of the BIOS module 240. One of skill in the art will recognize that the BIOS module instructions may be stored in other types of nonvolatile storage devices.

The BIOS module 240 typically lacks functionality that is typically found in an operating system. For example, in the past the BIOS module 240 may have been unable to communicate through the network module 245 over the network 115 with the server 120. The present invention supports secure communication with the server 120 that may modify a policy used by the BIOS module 240 in booting the computer 110.

Figure 3:
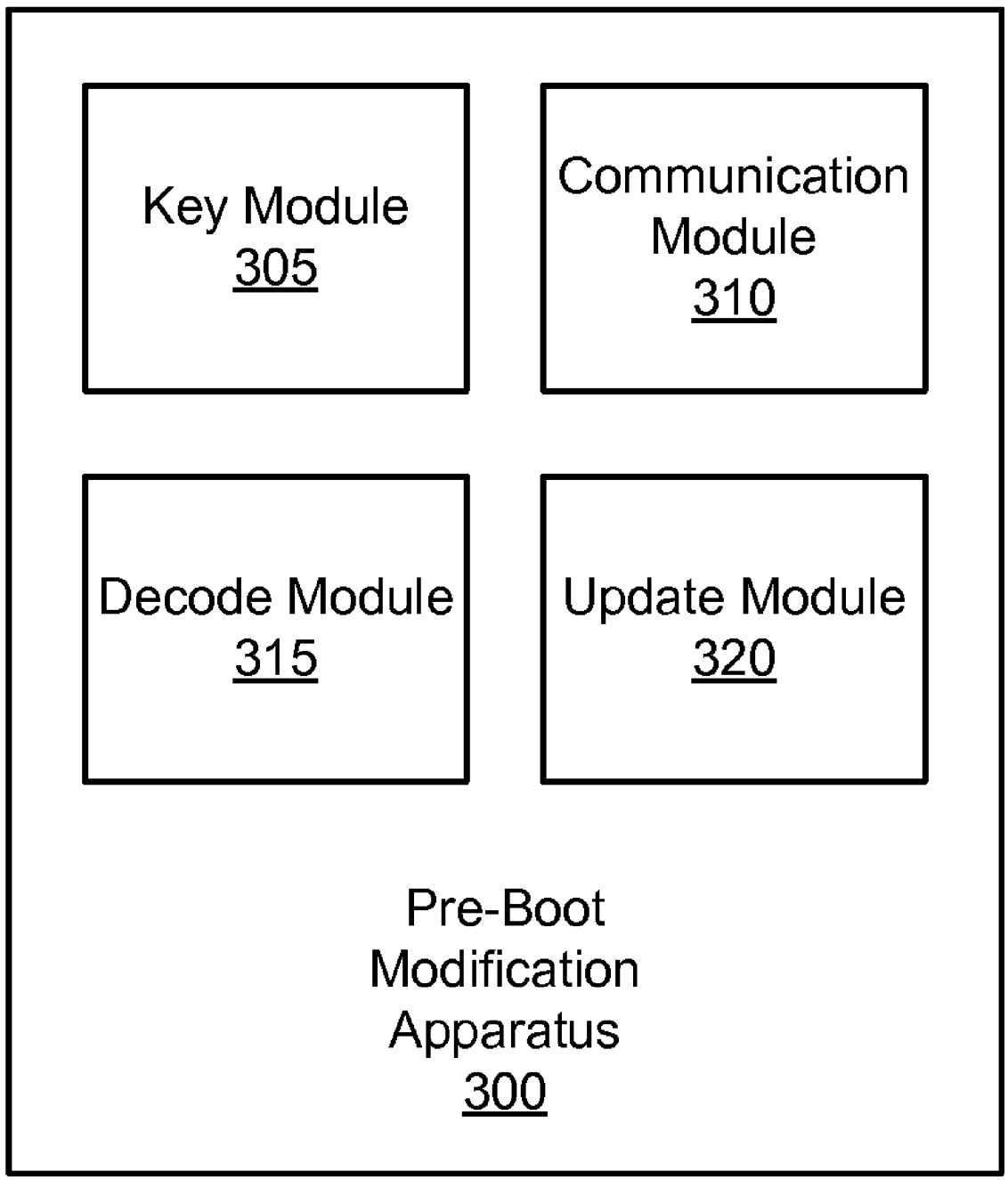
FIG. 3 is a schematic block diagram illustrating one embodiment of a pre-boot modification apparatus of the present invention.

FIG. 3 is a schematic block diagram illustrating one embodiment of a pre-boot modification apparatus 300 of the present invention. The pre-boot modification apparatus 300 may be embodied in each of the computers 110 of FIGS. 1-2. In a certain embodiment, the pre-boot modification apparatus 300 is embodied in the BIOS module 240 of FIG. 2. The description of the pre-boot modification apparatus 300 refers to elements of FIGS. 1-2, like numbers referring to like elements. The apparatus 300 includes a key module 305, a communication module 310, a decoder module 315, and an update module 320.

The key module 305 exchanges a key with the server 120 in a secure environment. The operating system may provide the secure environment. For example, the operating system may communicate the key using a public key/private key key pair. In one embodiment, the key module 305 is embodied in computer program product comprising a computer useable medium having a computer readable program stored on a tangible storage device such as the BIOS module 240 and/or the storage module 265.

The communication module 310 receives a policy encoded with the key. The policy may be employed by the BIOS module 240 to configure the computer 110 during boot. For example, the BIOS module 240 may save policy settings and use the settings in booting the computer 110. Therefore the policy may be required by the BIOS module 240 before the completion of the boot and the execution of the operating system by the computer 110.

In one embodiment, the policy is a group policy for the plurality of computers 110 of FIG. 1. For example, the server 120 may apply the same policy to each of the plurality of computers 110. In a certain embodiment, the group policy comprises a BIOS password. Alternatively, the group policy may include a hard disk drive password. In one embodiment, the communication module 310 is embodied in computer program product comprising a computer useable medium having a computer readable program stored on a tangible storage device such as the BIOS module 240 and/or the storage module 265.

The decode module 315 decodes the encoded policy using the key and saves the policy setting prior to booting the operating system on the computer 110. In one embodiment, the decode module 315 is embodied in computer program product comprising a computer useable medium having a computer readable program stored on a tangible storage device such as the BIOS module 240 and/or the storage module 265.

The update module 320 boots the computer 110 using the policy. In one embodiment, the update module 320 is embodied in computer program product comprising a computer useable medium having a computer readable program stored on a tangible storage device such as the BIOS module 240 and/or the storage module 265.

Figure 4:
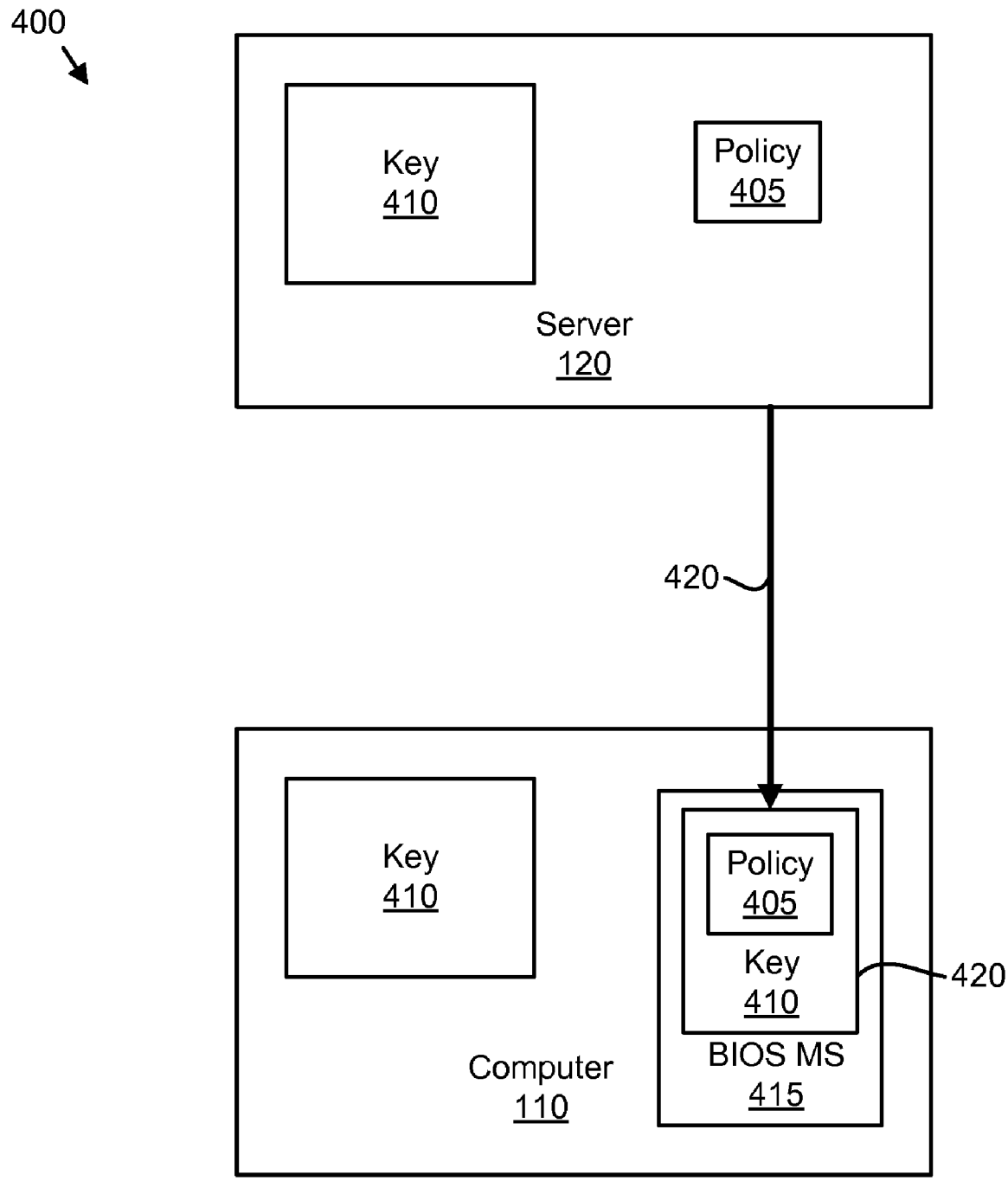
FIG. 4 is a schematic block diagram illustrating one embodiment of encoded policy communication of the present invention.

FIG. 4 is a schematic block diagram illustrating one embodiment of encoded policy communication 400 of the present invention. The communication 400 illustrates communication of a policy 405 from the server 120 to the computer 110. The description of the communication 400 refers to elements of FIGS. 1-3, like numbers referring to like elements.

The server 120 is shown comprising a key 410 and the policy 405. In one embodiment, the key 410 is a string of alphanumeric numerals. In a certain embodiment, the key 410 is a string of numeric numerals. The key 410 may have a specified length, such as 120 numerals. One of skill in the art will recognize that the present invention may be practiced with other configurations of keys 410.

The policy 405 may comprise one or more settings used to boot the computer 110. For example, the policy 405 may include a hard disk drive password. Alternatively, the policy 405 may include a network address for the computer 110.

Both the server 120 and computer 110 share the key 410. The server 120 and computer 110 may securely communicate the key 410 as is well known to those of skill in the art. For example, the operating system of the computer 110 may securely receive the key 410 encrypted from the server 120.

In one embodiment, the computer 110 includes a BIOS mail space 415. The BIOS mail space 415 may comprise a plurality of memory space words in the BIOS module 240. Alternatively, the BIOS mail space 415 may comprise a plurality of memory space words in the storage module 265.

The server 120 may encode the policy 405 with the key 410. In one embodiment, the server 120 encodes the policy 405 with the key 410 by applying an algorithm to both the policy 405 and to key 410 to form an alphanumeric string as is well known to those of skill in the art. The encoded policy 420 is depicted with the key 410 surrounding the policy 405, with the encoded policy 420 being the key 410/policy 405 combination.

In one embodiment, the server 120 communicates the encoded policy 420 to a post-boot operating system of the computer 110 before the BIOS module 240 reboots the computer 110. The post-boot operating system may be the normal computer operating system 110. Alternatively, the post-boot operating system may be a special purpose operating system for configuring client computers 110.

The operating system of the computer 110 may store the encoded policy 420 in the BIOS mail space 415. The communication module 310 may receive the encoded policy 420 when the BIOS module 240 boots the computer 110.

In one embodiment, software instructions from the BIOS module 240 executing on the processor module 205 decode the encoded policy 420 to recover the policy 405. The policy settings of the policy 405 may be stored in the BIOS module 240. In an alternate embodiment, the policy 405 may be written to the memory module 215. The BIOS module 240 may then boot the computer 110 using the policy 405.

Figure 5:
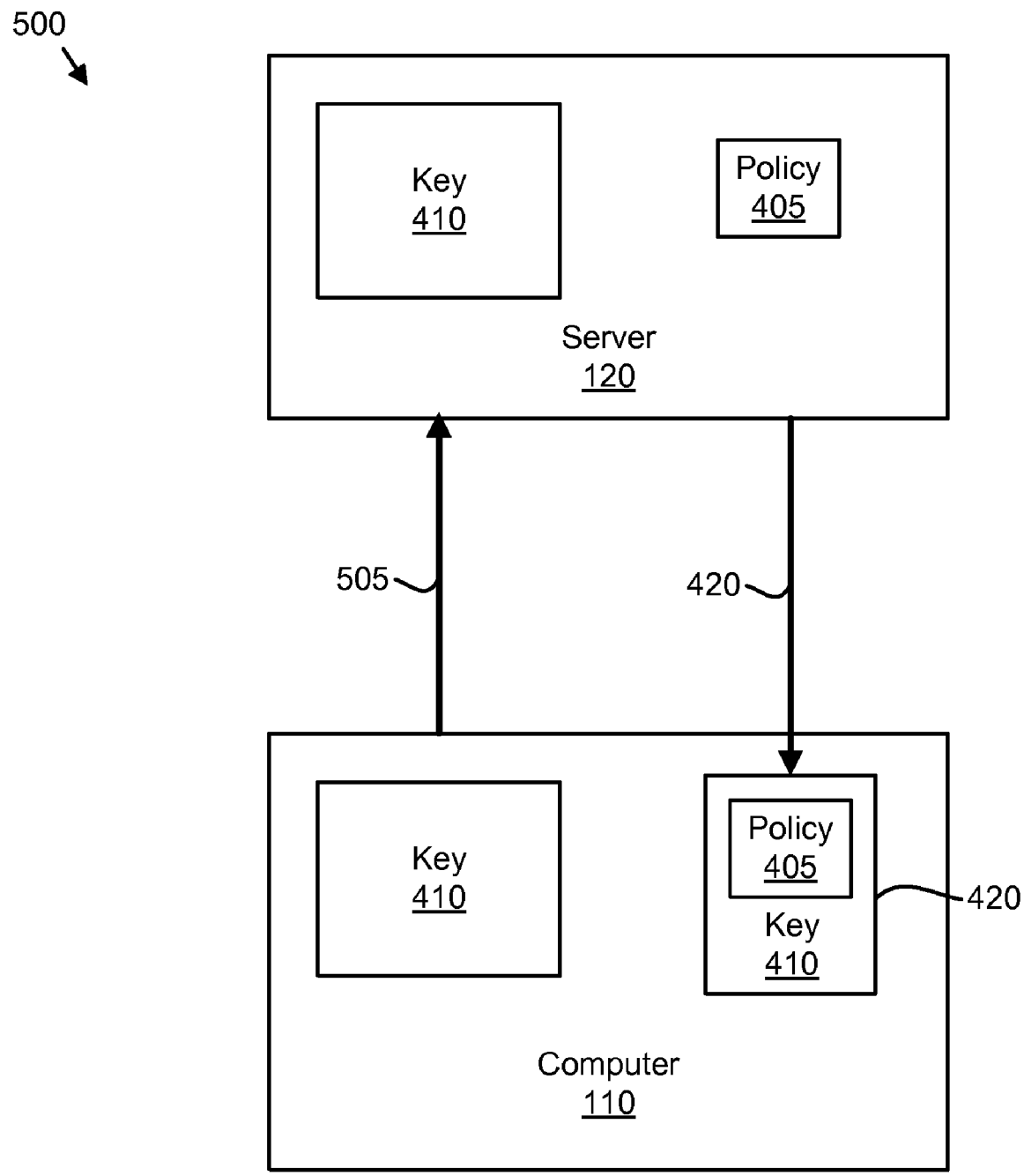
FIG. 5 is a schematic block diagram illustrating one alternate embodiment of encoded policy communication of the present invention.

FIG. 5 is a schematic block diagram illustrating one alternate embodiment of encoded policy communication 500 of the present invention. The communication 500 illustrates an alternate communication of the policy 405 from the server 120 to the computer 110. The description of the communication 500 refers to elements of FIGS. 1-4, like numbers referring to like elements.

In one embodiment, the communication module 310 requests the policy 405 from the server 120. The communication module 310 may communicate a message 505 to the server 120 to request a policy 405. In one embodiment, the communication module 310 authenticates the message 505 by encrypting the message 505 with the key 410. Alternatively, the communication module 310 may authenticate the message 505 by encrypting a token with the key 410 and including the encrypted token in the message 505.

The communication module 310 may be configured to activate the network module 245 and communicate with the server 120 through the network module 245 and the network 115. In one embodiment, the communication module functionality for communicating over the network 115 is limited to requesting and exchanging the encoded policy 420 with the server 120.

The communication module 310 may receive the encoded policy 420 from the server 120. In one embodiment, the server 120 communicates the encoded policy 420 through the network 115 and the network module 245. Software instructions from the BIOS module 240 executing on a processor module 205 may decode the encoded policy 420 to recover the policy 405. The policy 405 may be stored in the BIOS module 240. In an alternate embodiment, the policy 405 may be stored in a memory module 215.

The BIOS module 240 boots the computer 110 using the policy settings of the policy 405. The present invention allows for the update and/or modification of the policy 405 before the operating system boots on the computer 110. Thus settings that are employed during the boot may be modified.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
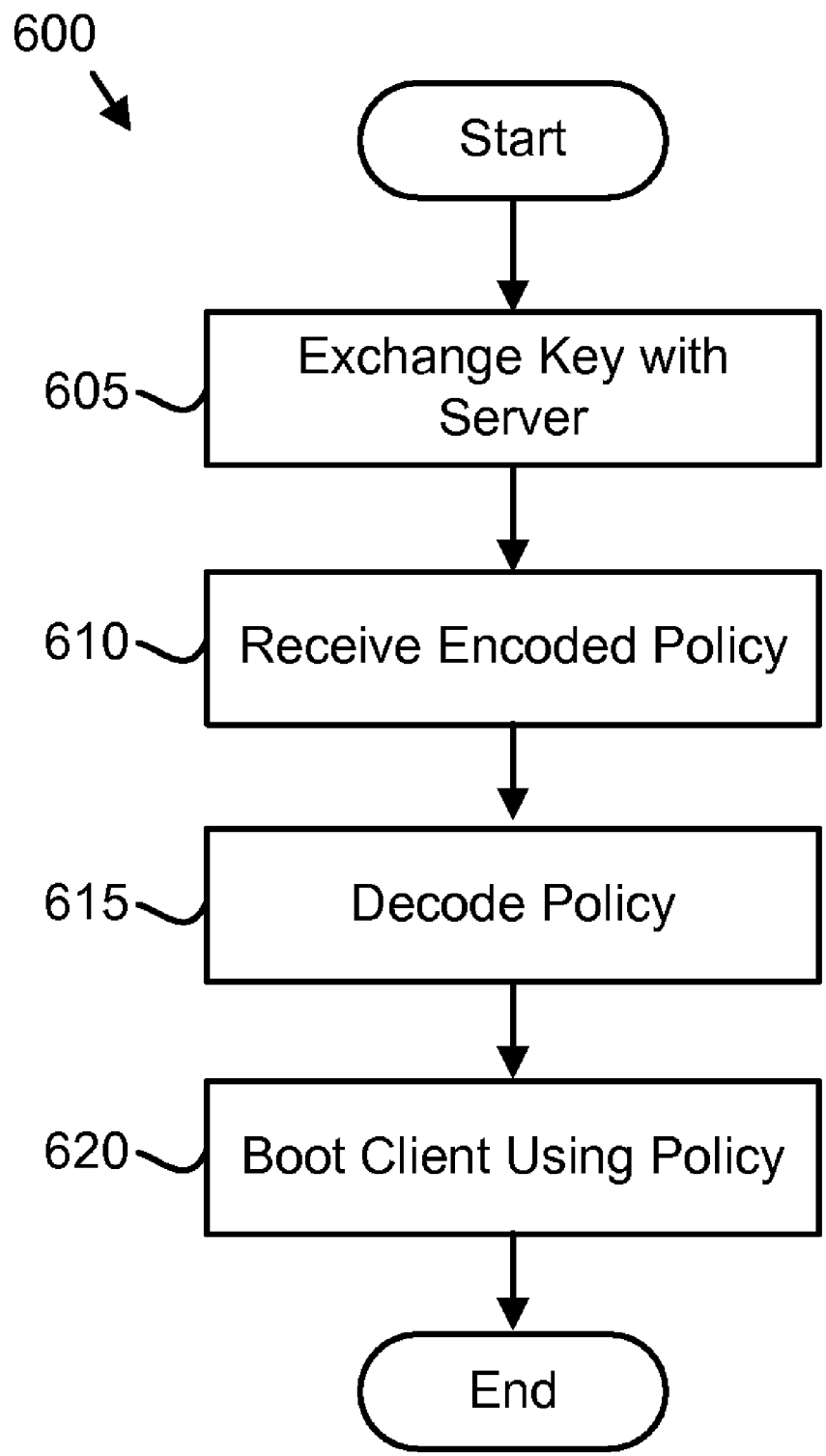
FIG. 6 is a schematic flow chart diagram illustrating one embodiment of a pre-boot policy modification method of the present invention.

FIG. 6 is a schematic flow chart diagram illustrating one embodiment of a pre-boot policy modification method 600 of the present invention. The method 600 substantially includes the steps to carry out the functions presented above with respect to the operation of the described apparatus and system of FIGS. 1-5. In one embodiment, the method 600 is implemented with a computer program product comprising a computer readable medium having a computer readable program. The computer readable program may be executed by the computer 110.

The key module 305 exchanges 605 the key 410 with the server 120 in a secure environment. In one embodiment, the key module 305 exchanges 605 the key 410 with the server 120 when the computer 110 is initialized to operate on the client/server system 100. Alternatively, the operating system of the computer 110 may establish a secure communications channel through the network 115 with the server 120. The operating system may receive the key 410 through the secure communications channel.

In one embodiment, the key module 305 and the server 120 each store the key 410 in a secure repository. For example, the key module 305 and the server 120 may each store the key 410 in a Trusted Platform Module (TPM) as is well known to those of skill in the art. Alternatively, the key module 305 and the server 120 may each encrypt the key 410 and store the encrypted key. In one embodiment, the key module 305 stores the key 410 in non-volatile memory such as a flash random access memory of the BIOS module 240. The key 410 may only be accessible by the BIOS module 240.

The communication module 310 receives 610 the policy 405 encoded with the key 410. In one embodiment, the server 120 communicates the encoded policy 420 to the operating system of the computer 110. The server 120 may direct the operating system to store the encoded policy 420 in the BIOS mail space 415. In one embodiment, the server may communicate an authentication to the operating system. The authentication may permit the operating system to store the encoded policy 420 in the BIOS mail space 415.

In an alternate embodiment, the communication module 310 requests the policy 405 prior to booting the operating system on the computer 110. The communication module 310 may use the key 410 to request the policy 405. For example, the communication module 310 may encrypt the request with the key 410. The communication module 310 may then receive the encoded policy 420 from the server 120 in response to the request.

The decode module 315 decodes 620 the encoded policy 420 using the key 410. In addition, the decode module 315 may save a policy setting prior to booting the operating system on the computer 110. For example, the policy 405 may specify a policy setting such as a network address for the computer 110. One or more of the policy settings may be unalterable after the computer 110 is booted, necessitating pre-boot modification. The decode module 315 may save the policy setting for use by other executable code such as the update module 320.

The update module 320 boots 620 the computer 110 using the policy 405. In one embodiment, the update module 320 boots 620 the operating system using policy settings from the policy 405. Upon booting, the operating system manages the computer 110 using the policy settings.

The present invention modifies policies used in booting a computer 110 before completing the boot. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program stored on a tangible storage device, wherein the computer readable program when executed on a computer causes the computer to:
   exchange a key with a server in a secure environment as the computer is initialized to operate in a client/server environment with the server;
   receive with a post-boot operating system on the computer a policy encoded with the key, wherein the policy is used by a Binary Input/Output System (BIOS) to configure the computer during a boot;
   store the policy encoded with the key in a BIOS mail space of a Trusted Platform Module;
   decode the encoded policy using the key and save the policy prior to booting the operating system on the computer, wherein the policy is unalterable after the computer is booted and comprises a hard disk drive password and a network address; and
   boot the computer using the policy.

2. The computer program product of claim 1, wherein the policy is a group policy for a plurality of computers.

3. The computer program product of claim 2, wherein the group policy comprises a BIOS password.

4. The computer program product of claim 3, wherein the computer readable program is further configured to cause the computer to request the policy using the key prior to booting the operating system on the computer.

5. An apparatus comprising:
   a storage device storing a computer readable program executed by a processor, the computer readable program comprising:
   a key module configured to exchange a key with a server in a secure environment as a computer is initialized to operate in a client/server environment with the server;
   a communication module configured to receive with a post-boot operating system on the computer, a policy encoded with the key, wherein the policy is used by a Binary Input/Output System (BIOS) to configure the computer during a boot, and store the policy encoded with the key in a BIOS mail space of a Trusted Platform Module;
   a decode module configured to decode the encoded policy using the key and save the policy prior to booting the operating system on the computer, wherein the policy is unalterable after the computer is booted and comprises a hard disk drive password and a network address; and
   an update module configured to boot the computer using the policy.

6. The apparatus of claim 5, wherein the policy is a group policy for a plurality of computers.

7. The apparatus of claim 6, wherein the group policy comprises a BIOS password.

8. The apparatus of claim 7, wherein the communication module is further configured to request the policy using the key prior to booting the operating system on the computer.

9. A system comprising:
   a network;
   a server in communication with the network;
   a plurality of computers in communication with the server through the network, each computer comprising a storage device storing a computer readable program executed by a processor, the computer readable program comprising:
   a key module configured to exchange a key with the server in a secure environment as the computer is initialized to operate in a client/server environment with the server;
   a communication module configured to receive with a post-boot operating system on the computer a policy encoded with the key, wherein the policy is used by a Binary Input/Output System (BIOS) of the computer to configure the computer during a boot, and store the policy encoded with the key in a BIOS mail space of a Trusted Platform Module;
   a decode module configured to decode the encoded policy using the key and save the policy prior to booting the operating system on the computer, wherein the policy is unalterable after the computer is booted and comprises a hard disk drive password and a network address; and
   an update module configured to boot the computer using the policy.

10. The system of claim 9, wherein the policy is a group policy for the plurality of computers.

11. The system of claim 10, wherein the group policy comprises a BIOS password.

12. The system of claim 9, wherein the communication module is further configured to request the policy using the key prior to booting the operating system on the computer.

* * * * *